US010812694B2

(12) United States Patent
Zhang

(10) Patent No.: US 10,812,694 B2
(45) Date of Patent: Oct. 20, 2020

(54) REAL-TIME INSPECTION GUIDANCE OF TRIANGULATION SCANNER

(71) Applicant: FARO Technologies, Inc., Lake Mary, FL (US)

(72) Inventor: Chi Zhang, Wilmington, DE (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 1520 days.

(21) Appl. No.: 14/458,488

(22) Filed: Aug. 13, 2014

(65) Prior Publication Data

US 2015/0054946 A1 Feb. 26, 2015

Related U.S. Application Data

(60) Provisional application No. 61/868,124, filed on Aug. 21, 2013.

(51) Int. Cl.
*H04N 5/00* (2011.01)
*H04N 5/225* (2006.01)
*G01B 11/25* (2006.01)
*G06T 1/00* (2006.01)
*G06K 9/00* (2006.01)

(52) U.S. Cl.
CPC ........... *H04N 5/2256* (2013.01); *G01B 11/25* (2013.01); *G01B 11/2513* (2013.01); *G06K 9/00664* (2013.01); *G06T 1/0007* (2013.01); *G06T 2207/10004* (2013.01)

(58) Field of Classification Search
CPC .................................. G01B 11/00; G06T 7/00
USPC .............................................. 348/42–60, 146
See application file for complete search history.

(56) References Cited

U.S. PATENT DOCUMENTS

| | | | |
|---|---|---|---|
| 2006/0017720 A1* | 1/2006 | Li | G01B 11/2504 345/419 |
| 2012/0281087 A1* | 11/2012 | Kruse | G01B 11/25 348/136 |
| 2013/0125408 A1* | 5/2013 | Atwell | G01B 11/005 33/503 |
| 2014/0168370 A1* | 6/2014 | Heidemann | G06T 7/33 348/46 |

OTHER PUBLICATIONS

International Search Report and Written Opinion for Application No. PCT/US2014/051185 dated Oct. 28, 2014, 11 pages.

* cited by examiner

*Primary Examiner* — Dave Czekaj
*Assistant Examiner* — Shanika M Brumfield
(74) *Attorney, Agent, or Firm* — Cantor Colburn LLP

(57) ABSTRACT

A processor and projector images a coded projector pattern of light on a portion of an object providing a first coded surface pattern of light, images a first sequential projector pattern of light on another portion of the object providing a first sequential surface pattern of light, and images a second sequential projector pattern of light on the other portion providing a second sequential surface pattern of light. A camera forms a first coded image of the first coded surface pattern of light and generates a first coded array, forms a first sequential image of the first sequential surface pattern of light and generates a first sequential array, forms a second sequential image of the second sequential surface pattern of light and generates a second sequential array. The processor determines a correspondence between the camera and projector, and measures three-dimensional coordinates of the object.

22 Claims, 9 Drawing Sheets

REAL-TIME INSPECTION GUIDANCE OF TRIANGULATION SCANNER

CROSS REFERENCE TO RELATED APPLICATIONS

This application claims the benefit of U.S. Provisional Application Ser. No. 61/868,124, filed Aug. 21, 2013, which is incorporated herein by reference in its entirety.

BACKGROUND

The present disclosure relates to a triangulation scanner that measures three-dimensional (3D) coordinates.

A triangulation scanner measures 3D coordinates of a surface of an object by projecting a pattern of light onto the surface, imaging the light pattern with a camera, and performing a triangulation calculation to determine the 3D coordinates of points on the surface. A triangulation scanner includes a projector and a camera separated from one another by a baseline distance. The projector includes an illuminated pattern and a projector lens, and the camera includes a lens and a photosensitive array.

A category of triangulation scanner is a structured light scanner that projects light over an area. This type of scanner is distinguished from a line scanner that projects light in a single line or stripe. A first type of structured light scanner projects a coded pattern of light onto a surface to be measured. In general, the pattern of light that appears on the photosensitive array of the camera is shifted and distorted according to the position and shape of the surface onto which the light is projected. However, in a coded pattern of light, the window that encompasses the pattern of light is broken into a two-dimensional array of subwindows, each of the subwindows is distinguished from adjacent subwindows. By matching the pattern of light captured by the photosensitive array to the pattern of light on the subwindows, it is possible to draw a correspondence between points on the illuminated pattern and points on the photosensitive array. This matching enables triangulation calculations to be performed to provide the 3D coordinates of surface points. By this means, 3D coordinates of surface points may be determined relatively quickly based on a single image captured by the camera. This method is widely used with handheld scanners. Some examples of coded patterns of light are given by Jason Geng in section 5 of "Structured-light in 3D surface imaging: a tutorial," Advances in Optics and Photonics, 3, 128-160 (2011).

A second type of structured light scanner, which is generally more accurate than a scanner that emits a coded pattern, is one that projects a sequence of illuminated patterns onto the surface to be measured. A scanner that emits a sequence of illuminated patterns must ordinarily be held stationary while a sequence of images is collected. Some examples of sequential patterns of light are given by Jason Geng in section 2 of "Structured-light in 3D surface imaging: a tutorial," Advances in Optics and Photonics, 3, 128-160, (2011). A common and relatively highly accurate method is based on the use of the phase shift method discussed in this reference.

A step in measuring 3D coordinates with laser scanners is positioning the scanner in relation to the surface to be scanned. On the one hand, the scanner should be placed a suitable distance from the surface—neither too close nor too far away—and it should be oriented properly relative to the surface. It is also necessary to position the scanner side-to-side to measure the coordinates of the desired features.

Today scanners often project intersecting lines of light to indicate when a scanner is an optimum distance from a surface under test. The operator may adjust the distance from the scanner to the surface visually based on the point of intersection. For the case of a scanner mounted on a robot, it is common practice to program the robot for each part that is to be measured. When the scanner is positioned manually or under computer control in a motorized system, extra effort is required to adapt the scanner to measure the surfaces of different objects.

What is needed is a method of simplifying the positioning of structured light scanners in relation to the surfaces being measured while, at the same time, measuring 3D coordinates of surface points to relatively high accuracy.

SUMMARY OF THE INVENTION

An embodiment of the invention includes a method for measuring three-dimensional (3D) coordinates of a surface of an object. In the method, a structured light scanner that includes a processor, a projector, and a camera is provided. Generating via the processor a first coded projector pattern of light on a plane of patterned illumination at a first time, the first coded projector pattern of light being confined to a window in the plane, the window including a collection of subwindows arranged in two dimensions on the plane with each subwindow within the collection of subwindows having a subwindow pattern of light different than and distinguishable from the subwindow pattern of light of each adjacent subwindow. Using the projector, imaging the first coded projector pattern of light onto a first portion of the surface of the object to obtain a first coded surface pattern of light on the first portion. Using the camera, forming a first coded image that is an image of the first coded surface pattern of light and generating in response a first coded array, the first coded array being an array of digital values. Sending the first coded array to the processor. Determining via the processor a correspondence between each element of the first coded array and respective ones of the subwindows. Determining via the processor in a first frame of reference of the scanner first coded 3D coordinates, the first coded 3D coordinates being 3D coordinates of points on the first portion, the first coded 3D coordinates based at least in part on the first coded projector pattern of light, the first coded array, the correspondence, a length of a baseline distance between the camera and the projector, a pose of the camera, and a pose of the projector. Moving the scanner and/or the object to change the object from a first pose to a second pose, the first pose and the second pose of the object being given in the first frame of reference, the second pose of the object based at least on the first coded 3D coordinates and on a definable scanner standoff distance relative to the object. Generating via the processor at a second time a first sequential projector pattern of light on the plane of patterned illumination. Using the projector, imaging the first sequential projector pattern of light onto a second portion of the surface of the object to obtain a first sequential surface pattern of light on the second portion. Using the camera forming a first sequential image that is an image of the first sequential surface pattern of light and generating in response a first sequential array, the first sequential array being an array of digital values. Sending the first sequential array to the processor. Generating via the processor at a third time a second sequential projector pattern of light on the plane of patterned illumination. Using the projector, imaging the second sequential projector pattern of light onto the second portion of the surface of the object to obtain a second sequential surface pattern of light on the second portion. Using the camera, forming a second sequential image that is an image of the second sequential surface pattern of light and generating in response a second sequential array, the second sequential array being an array of digital values. Sending the second sequential array to the processor. Determining via the processor in the first frame of reference sequential 3D coordinates, the sequential 3D coordinates being 3D coordinates of points on the second portion, the sequential 3D coordinates based at least in part on the first sequential projector pattern of light, the first sequential array, the second sequential projector pattern of light, the second sequential array, the length of the baseline, the camera pose, and the projector pose. And, storing the sequential 3D coordinates.

Another embodiment of the invention includes an apparatus for measuring three-dimensional (3D) coordinates of a surface of an object, the apparatus having a structured light scanner comprising a processor, a projector, and a camera. The processor is responsive to executable instructions which when executed by the processor facilitates the above-stated method.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

As explained hereinabove, a triangulation scanner that projects a pattern of light in an area, a (2D) pattern, onto an object surface is often referred to as a structured light scanner. A discussion of structured light scanners is given in U.S. Published Application 2012/0262550 (Publication '550) to Bridges, the entire contents of which are incorporated by reference herein.

General Discussion of Structured Light Scanners and Triangulation

Figure 1:
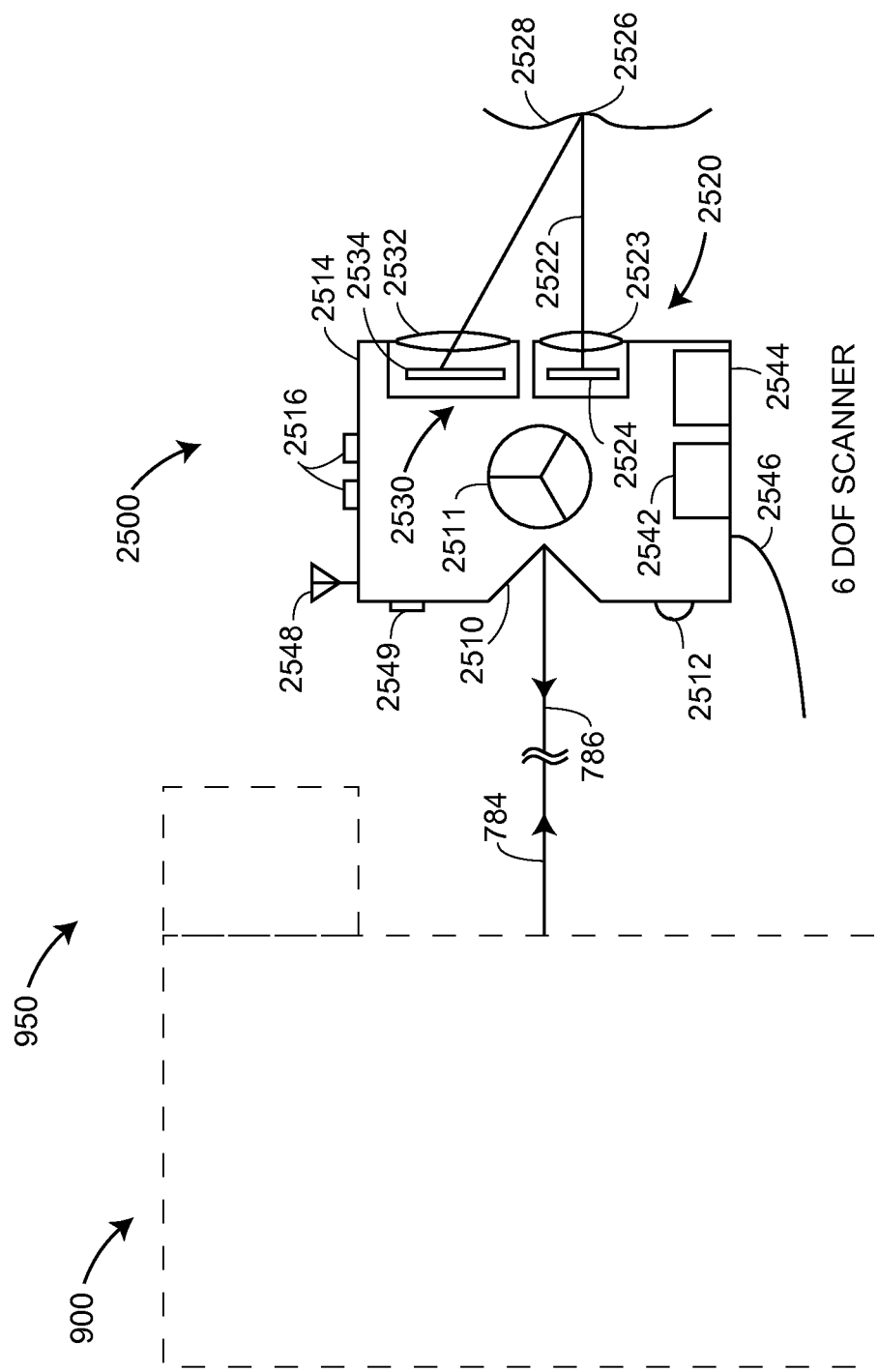
FIG. 1 depicts an embodiment of a six-DOF (Degree Of Freedom) scanner used in conjunction with an optoelectronic system and a locator camera system.

FIG. 1 shows an embodiment of a six-DOF scanner 2500 used in conjunction with an optoelectronic system 900 and a locator camera system 950. The six-DOF scanner 2500 may also be referred to as a "target scanner." The optoelectronic system 900 and the locator camera system 950 were discussed in reference to FIG. 13 in Publication '550. In another embodiment, the optoelectronic system 900 is replaced by the optoelectronic system that uses two or more wavelengths of light. The six-DOF scanner 2500 includes a body 2514, one or more retroreflectors 2510, 2511 a scanner camera 2530, a scanner light projector 2520, an optional electrical cable 2546, an optional battery 2444, an interface component 2512, an identifier element 2549, actuator buttons 2516, an antenna 2548, and an electronics circuit board 2542. The retroreflector 2510, the optional electrical cable 2546, the optional battery 2544, the interface component 2512, the identifier element 2549, the actuator buttons 2516, the antenna 2548, and the electronics circuit board 2542 in FIG. 1 correspond to the retroreflector 2010, the optional electrical cable 2046, the optional battery 2044, the interface component 2012, the identifier element 2049, actuator buttons 2016, the antenna 2048, and the electronics circuit board 2042, respectively, discussed in reference to FIG. 14 in Publication '550. The descriptions for these corresponding elements are the same as discussed in reference to FIG. 14 in Publication '550. Together, the scanner projector 2520 and the scanner camera 2530 are used to measure the three dimensional coordinates of a workpiece 2528. The camera 2530 includes a camera lens system 2532 and a photosensitive array 2534. The photosensitive array 2534 may be a CCD or CMOS array, for example. The scanner projector 2520 includes a projector lens system 2523 and a source pattern of light 2524. The source pattern of light may emit a point of light, a line of light, or a structured (two dimensional) pattern of light. If the scanner light source emits a point of light, the point may be scanned, for example, with a moving mirror, to produce a line or an array of lines. If the scanner light source emits a line of light, the line may be scanned, for example, with a moving mirror, to produce an array of lines. In an embodiment, the source pattern of light might be an LED, laser, or other light source reflected off a digital micromirror device (DMD) such as a digital light projector (DLP) from Texas Instruments, a liquid crystal device (LCD) or liquid crystal on silicon (LCOS) device, or it may be a similar device used in transmission mode rather than reflection mode. The source pattern of light might also be a slide pattern, for example, a chrome-on-glass slide, which might have a single pattern or multiple patterns, the slides moved in and out of position as needed. Additional retroreflectors, such as retroreflector 2511, may be added to the first retroreflector 2510 to enable the laser tracker to track the six-DOF scanner from a variety of directions, thereby giving greater flexibility in the directions to which light may be projected by the six-DOF projector 2500.

The six-DOF scanner 2500 may be held by hand or mounted, for example, on a tripod, an instrument stand, a motorized carriage, or a robot end effector. The three dimensional coordinates of the workpiece 2528 is measured by the scanner camera 2530 by using the principles of triangulation. There are several ways that the triangulation measurement may be implemented, depending on the pattern of light emitted by the scanner light source 2520 and the type of photosensitive array 2534. For example, if the pattern of light emitted by the scanner light source 2520 is a line of light or a point of light scanned into the shape of a line and if the photosensitive array 2534 is a two dimensional array, then one dimension of the two dimensional array 2534 corresponds to a direction of a point 2526 on the surface of the workpiece 2528. The other dimension of the two dimensional array 2534 corresponds to the distance of the point 2526 from the scanner light source 2520. Hence the three dimensional coordinates of each point 2526 along the line of light emitted by scanner light source 2520 is known relative to the local frame of reference of the six-DOF scanner 2500. The six degrees of freedom of the six-DOF scanner are known by the six-DOF laser tracker using the methods described in U.S. Pat. No. 7,800,758 (patent '758). From the six degrees of freedom, the three dimensional coordinates of the scanned line of light may be found in the tracker frame of reference, which in turn may be converted into the frame of reference of the workpiece 2528 through the measurement by the laser tracker of three points on the workpiece, for example.

If the six-DOF scanner 2500 is held by hand, a line of laser light emitted by the scanner light source 2520 may be moved in such a way as to "paint" the surface of the workpiece 2528, thereby obtaining the three dimensional coordinates for the entire surface. It is also possible to "paint" the surface of a workpiece using a scanner light source 2520 that emits a structured pattern of light. Alternatively, when using a scanner 2500 that emits a structured pattern of light, more accurate measurements may be made by mounting the six-DOF scanner on a tripod or instrument stand. The structured light pattern emitted by the scanner light source 2520 might, for example, include a pattern of fringes, each fringe having an irradiance that varies sinusoidally over the surface of the workpiece 2528. In an embodiment, the sinusoids are shifted by three or more phase values. The amplitude level recorded by each pixel of the camera 2530 for each of the three or more phase values is used to provide the position of each pixel on the sinusoid. This information is used to help determine the three dimensional coordinates of each point 2526. In another embodiment, the structured light may be in the form of a coded pattern that may be evaluated to determine three-dimensional coordinates based on single, rather than multiple, image frames collected by the camera 2530. Use of a coded pattern may enable relatively accurate measurements while the six-DOF scanner 2500 is moved by hand at a reasonable speed.

Projecting a structured light pattern, as opposed to a line of light, has some advantages. In a line of light projected from a handheld six-DOF scanner 2500, the density of points may be high along the line but much less between the lines. With a structured light pattern, the spacing of points is usually about the same in each of the two orthogonal directions. In addition, in some modes of operation, the three-dimensional points calculated with a structured light pattern may be more accurate than other methods. For example, by fixing the six-DOF scanner 2500 in place, for example, by attaching it to a stationary stand or mount, a sequence of structured light patterns may be emitted that enable a more accurate calculation than would be possible other methods in which a single pattern was captured (i.e., a single-shot method). An example of a sequence of structured light patterns is one in which a pattern having a first spatial frequency is projected onto the object. In an embodiment, the projected pattern is pattern of stripes that vary sinusoidally in optical power. In an embodiment, the phase of the sinusoidally varying pattern is shifted, thereby causing the stripes to shift to the side. For example, the pattern may be made to be projected with three phase angles, each shifted by 120 degrees relative to the previous pattern. This sequence of projections provides enough information to enable relatively accurate determination of the phase of each point of the pattern, independent of the background light. This can be done on a point by point basis without considering adjacent points on the object surface.

Although the procedure above determines a phase for each point with phases running from 0 to 360 degrees between two adjacent lines, there may still be a question about which line is which. A way to identify the lines is to repeat the sequence of phases, as described above, but using a sinusoidal pattern with a different spatial frequency (i.e., a different fringe pitch). In some cases, the same approach needs to be repeated for three or four different fringe pitches. The method of removing ambiguity using this method is well known in the art and is not discussed further here.

To obtain the best possible accuracy using a sequential projection method such as the sinusoidal phase-shift method described above, it may be advantageous to minimize the movement of the six-DOF scanner. Although the position and orientation of the six-DOF scanner are known from the six-DOF measurements made by the laser tracker and although corrections can be made for movements of a handheld six-DOF scanner, the resulting noise will be somewhat higher than it would have been if the scanner were kept stationary by placing it on a stationary mount, stand, or fixture.

Figure 1A:
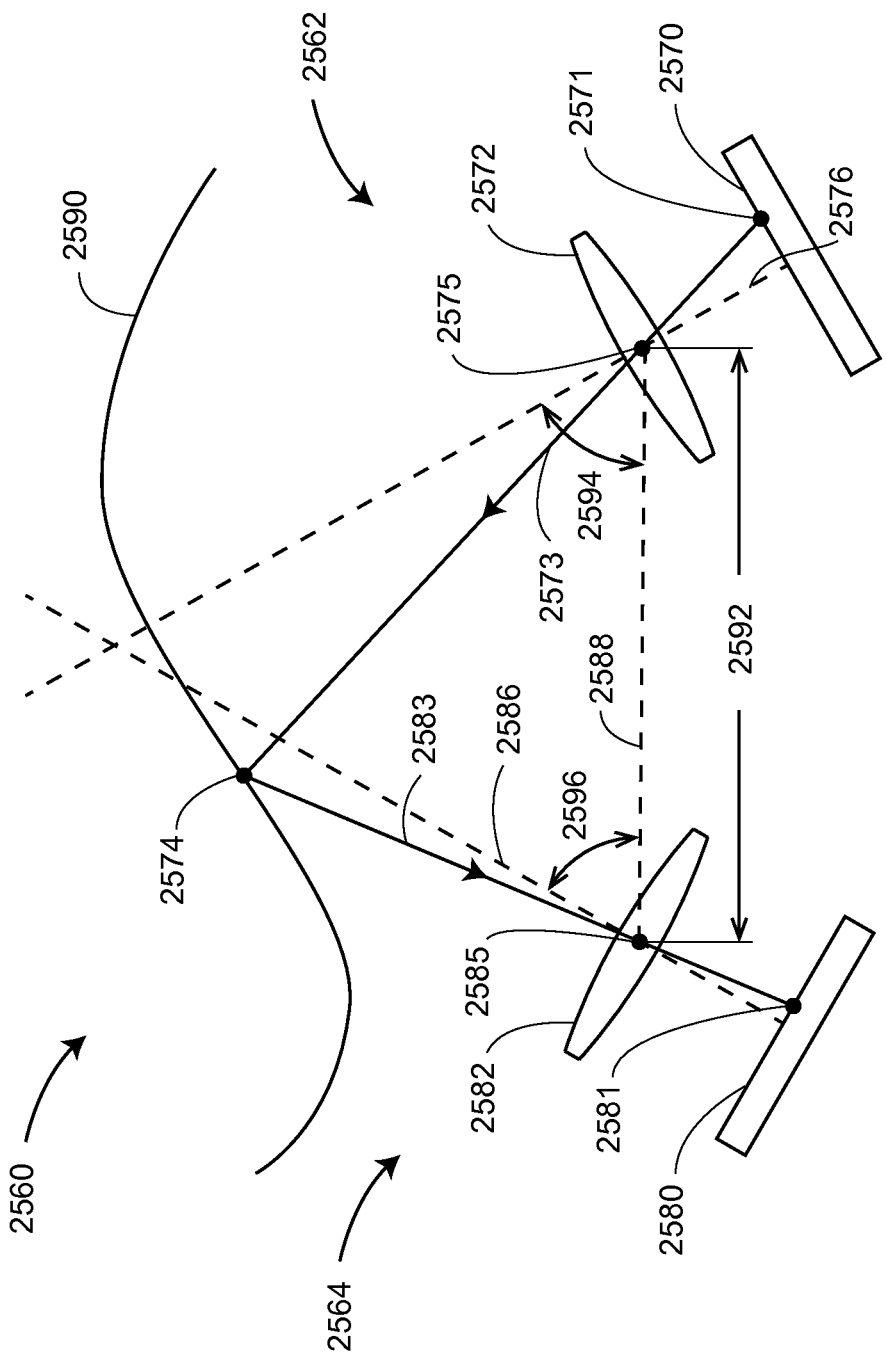
FIG. 1A depicts a system suitable for practicing principles of triangulation.

The scanning methods represented by FIG. 1 are based on the principle of triangulation. A more complete explanation of the principles of triangulation are given with reference to the system 2560 of FIG. 1A and the system 4760 of FIG. 1B. Referring first to FIG. 1A, the system 2560 includes a projector 2562 and a camera 2564. The projector 2562 includes a source pattern of light 2570 lying on a source plane and a projector lens 2572. The projector lens may include several lens elements. The projector lens has a lens perspective center 2575 and a projector optical axis 2576. The ray of light 2573 travels from a point 2571 on the source pattern of light through the lens perspective center onto the object 2590, which it intercepts at a point 2574.

The camera 2564 includes a camera lens 2582 and a photosensitive array 2580. The camera lens 2582 has a lens perspective center 2585 and an optical axis 2586. A ray of light 2583 travels from the object point 2574 through the camera perspective center 2585 and intercepts the photosensitive array 2580 at point 2581.

Figure 1B:
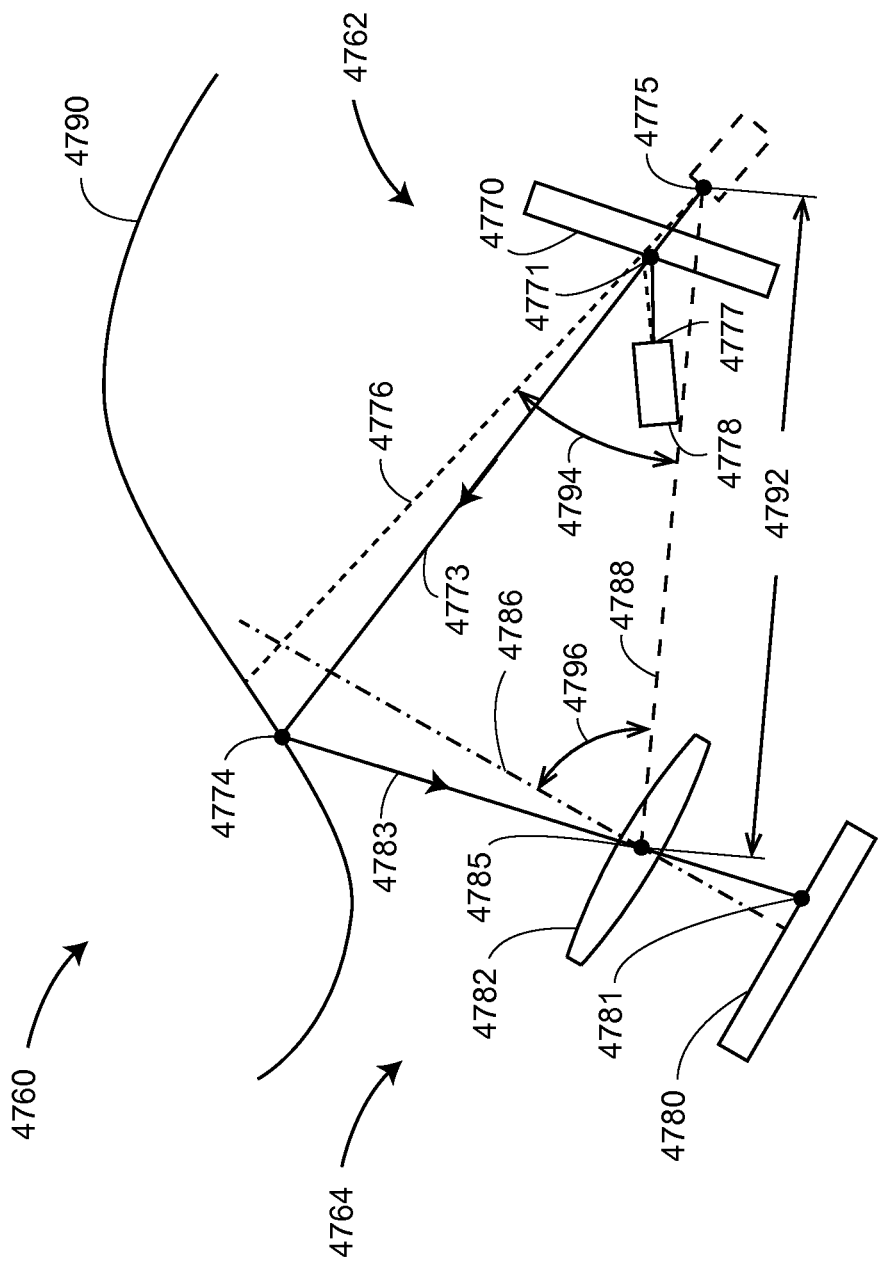
FIG. 1B depicts another system suitable for practicing principles of triangulation.

The line segment that connects the perspective centers is the baseline 2588 in FIG. 1A and the baseline 4788 in FIG. 1B. The length of the baseline is called the baseline length (2592, 4792). The angle between the projector optical axis and the baseline is the baseline projector angle (2594, 4794). The angle between the camera optical axis (2583, 4786) and the baseline is the baseline camera angle (2596, 4796). If a point on the source pattern of light (2570, 4771) is known to correspond to a point on the photosensitive array (2581, 4781), then it is possible using the baseline length, baseline projector angle, and baseline camera angle to determine the sides of the triangle connecting the points 2585, 2574, and 2575, and hence determine the surface coordinates of points on the surface of object 2590 relative to the frame of reference of the measurement system 2560. To do this, the angles of the sides of the small triangle between the projector lens 2572 and the source pattern of light 2570 are found using the known distance between the lens 2572 and plane 2570 and the distance between the point 2571 and the intersection of the optical axis 2576 with the plane 2570. These small angles are added or subtracted from the larger angles 2596 and 2594 as appropriate to obtain the desired angles of the triangle. It will be clear to one of ordinary skill in the art that equivalent mathematical methods can be used to find the lengths of the sides of the triangle 2574-2585-2575 or that other related triangles may be used to obtain the desired coordinates of the surface of object 2590.

Referring first to FIG. 1B, the system 4760 is similar to the system 2560 of FIG. 1A except that the system 4760 does not include a lens. The system may include a projector 4762 and a camera 4764. In the embodiment illustrated in FIG. 1B, the projector includes a light source 4778 and a light modulator 4770. The light source 4778 may be a laser light source since such a light source may remain in focus for a long distance using the geometry of FIG. 1B. A ray of light 4773 from the light source 4778 strikes the optical modulator 4770 at a point 4771. Other rays of light from the light source 4778 strike the optical modulator at other positions on the modulator surface. In an embodiment, the optical modulator 4770 changes the power of the emitted light, in most cases by decreasing the optical power to a degree. In this way, the optical modulator imparts an optical pattern to the light, referred to here as the source pattern of light, which is at the surface of the optical modulator 4770. The optical modulator 4770 may be a DLP or LCOS device for example. In some embodiments, the modulator 4770 is transmissive rather than reflective. The light emerging from the optical modulator 4770 appears to emerge from a virtual light perspective center 4775. The ray of light appears to emerge from the virtual light perspective center 4775, pass through the point 4771, and travel to the point 4774 at the surface of object 4790.

The baseline is the line segment extending from the camera lens perspective center 4785 to the virtual light perspective center 4775. In general, the method of triangulation involves finding the lengths of the sides of a triangle, for example, the triangle having the vertex points 4774, 4785, and 4775. A way to do this is to find the length of the baseline, the angle between the baseline and the camera optical axis 4786, and the angle between the baseline and the projector reference axis 4776. To find the desired angle, additional smaller angles are found. For example, the small angle between the camera optical axis 4786 and the ray 4783 can be found by solving for the angle of the small triangle between the camera lens 4782 and the photosensitive array 4780 based on the distance from the lens to the photosensitive array and the distance of the pixel from the camera optical axis. The angle of the small triangle is then added to the angle between the baseline and the camera optical axis to find the desired angle. Similarly for the projector, the angle between the projector reference axis 4776 and the ray 4773 is found can be found by solving for the angle of the small triangle between these two lines based on the known distance of the light source 4777 and the surface of the optical modulation and the distance of the projector pixel at 4771 from the intersection of the reference axis 4776 with the surface of the optical modulator 4770. This angle is subtracted from the angle between the baseline and the projector reference axis to get the desired angle.

The camera 4764 includes a camera lens 4782 and a photosensitive array 4780. The camera lens 4782 has a camera lens perspective center 4785 and a camera optical axis 4786. The camera optical axis is an example of a camera reference axis. From a mathematical point of view, any axis that passes through the camera lens perspective center may equally easily be used in the triangulation calculations, but the camera optical axis, which is an axis of symmetry for the lens, is customarily selected. A ray of light 4783 travels from the object point 4774 through the camera perspective center 4785 and intercepts the photosensitive array 4780 at point 4781. Other equivalent mathematical methods may be used to solve for the lengths of the sides of a triangle 4774-4785-4775, as will be clear to one of ordinary skill in the art.

Although the triangulation method described here is well known, some additional technical information is given herein below for completeness. Each lens system has an entrance pupil and an exit pupil. The entrance pupil is the point from which the light appears to emerge, when considered from the point of view of first-order optics. The exit pupil is the point from which light appears to emerge in traveling from the lens system to the photosensitive array. For a multi-element lens system, the entrance pupil and exit pupil do not necessarily coincide, and the angles of rays with respect to the entrance pupil and exit pupil are not necessarily the same. However, the model can be simplified by considering the perspective center to be the entrance pupil of the lens and then adjusting the distance from the lens to the source or image plane so that rays continue to travel along straight lines to intercept the source or image plane. In this way, the simple and widely used model shown in FIG. 1A is obtained. It should be understood that this description provides a good first order approximation of the behavior of the light but that additional fine corrections can be made to account for lens aberrations that can cause the rays to be slightly displaced relative to positions calculated using the model of FIG. 1A. Although the baseline length, the baseline projector angle, and the baseline camera angle are generally used, it should be understood that saying that these quantities are required does not exclude the possibility that other similar but slightly different formulations may be applied without loss of generality in the description given herein.

When using a six-DOF scanner, several types of scan patterns may be used, and it may be advantageous to combine different types to obtain the best performance in the least time. For example, in an embodiment, a fast measurement method uses a two-dimensional coded pattern in which three-dimensional coordinate data may be obtained in a single shot. In a method using coded patterns, different characters, different shapes, different thicknesses or sizes, or different colors, for example, may be used to provide distinctive elements, also known as coded elements or coded features. Such features may be used to enable the matching of the point 2571 to the point 2581 depicted in FIG. 1A. A coded feature on the source pattern of light 2570 may be identified on the photosensitive array 2580.

A technique that may be used to simplify the matching of coded features is the use of epipolar lines. Epipolar lines are mathematical lines formed by the intersection of epipolar planes and the source plane 2570 or the image plane 2580. An epipolar plane is any plane that passes through the projector perspective center and the camera perspective center. The epipolar lines on the source plane and image plane may be parallel in some special cases, but in general are not parallel. An aspect of epipolar lines is that a given epipolar line on the projector plane has a corresponding epipolar line on the image plane. Hence, any particular pattern known on an epipolar line in the projector plane may be immediately observed and evaluated in the image plane. For example, if a coded pattern is placed along an epipolar line in the projector plane that the spacing between coded elements in the image plane may be determined using the values read out by pixels of the photosensitive array 2580 and this information used to determine the three-dimensional coordinates of an object point 2574. It is also possible to tilt coded patterns at a known angle with respect to an epipolar line and efficiently extract object surface coordinates.

An advantage of using coded patterns is that three-dimensional coordinates for object surface points can be quickly obtained. However, in most cases, a sequential structured light approach, such as the sinusoidal phase-shift approach discussed above, will give more accurate results. Therefore, the user may advantageously choose to measure certain objects or certain object areas or features using different projection methods according to the accuracy desired. By using a programmable source pattern of light, such a selection may easily be made.

Figure 1C:
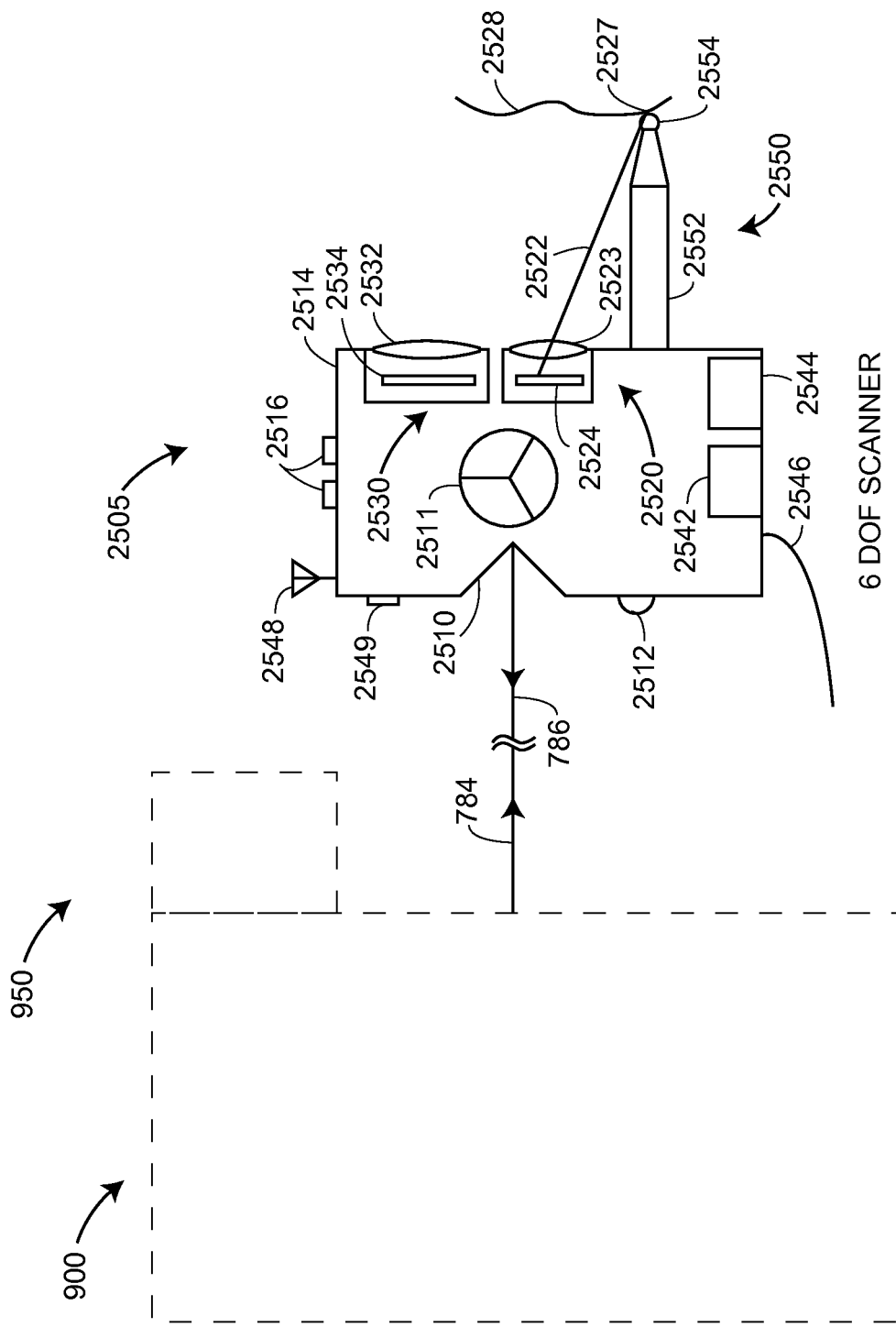
FIG. 1C depicts another embodiment of a six-DOF scanner.

An important limitation in the accuracy of scanners may be present for certain types of objects. For example, some features such as holes or recesses may be difficult to scan effectively. The edges of objects or holes may be difficult to obtain as smoothly as might be desired. Some types of materials may not return as much light as desired or may have a large penetration depth for the light. In other cases, light may reflect off more than one surface (multipath interference) before returning to the scanner so that the observed light is "corrupted," thereby leading to measurement errors. In any of these cases, it may be advantageous to measure the difficult regions using a six-DOF scanner 2505 shown in FIG. 1C that includes a tactile probe such as the probe tip 2554, which is part of the probe extension assembly 2550. After it has been determined that it would be advantageous to measure with a tactile probe, the projector 2520 may send a laser beam to illuminate the region to be measured. In FIG. 1C, a projected ray of beam of light 2522 is illuminating a point 2527 on an object 2528, indicating that this point is to be measured by the probe extension assembly 2550. In some cases, the tactile probe may be moved outside the field of projection of the projector 2550 so as to avoid reducing the measurement region of the scanner. In this case, the beam 2522 from the projector may illuminate a region that the operator may view. The operator can then move the tactile probe 2550 into position to measure the prescribed region. In other cases, the region to be measured may be outside the projection range of the scanner. In this case, the scanner may point the beam 2522 to the extent of its range in the direction to be measured or it may move the beam 2522 in a pattern indicating the direction to which the beam should be placed. Another possibility is to present a CAD model or collected data on a display monitor and then highlight on the display those regions of the CAD model or collected data that should be re-measured. It is also possible to measure highlighted regions using other tools, for example, a spherically mounted retroreflector or a six-DOF probe under control of a laser tracker.

The projector 2520 may project a two dimensional pattern of light, which is sometimes called structured light. Such light emerges from the projector lens perspective center and travels in an expanding pattern outward until it intersects the object 2528. Examples of this type of pattern are the coded pattern, discussed hereinabove, and the periodic pattern, discussed in Publication '550. The projector 2520 may alternatively project a one-dimensional pattern of light. Such projectors are sometimes referred to as laser line probes or laser line scanners. Although the line projected with this type of scanner has width and a shape (for example, it may have a Gaussian beam profile in cross section), the information it contains for the purpose of determining the shape of an object is one dimensional. So a line emitted by a laser line scanner intersects an object in a linear projection. The illuminated shape traced on the object is two dimensional. In contrast, a projector that projects a two-dimensional pattern of light creates an illuminated shape on the object that is three dimensional. One way to make the distinction between the laser line scanner and the structured light scanner is to define the structured light scanner as a type of scanner that contains at least three non-collinear pattern elements. For the case of a two-dimensional pattern that projects a coded pattern of light, the three non-collinear pattern elements are recognizable because of their codes, and since they are projected in two dimensions, the at least three pattern elements must be non-collinear. For the case of the periodic pattern, such as the sinusoidally repeating pattern, each sinusoidal period represents a plurality of pattern elements. Since there is a multiplicity of periodic patterns in two dimensions, the pattern elements must be non-collinear. In contrast, for the case of the laser line scanner that emits a line of light, all of the pattern elements lie on a straight line. Although the line has width and the tail of the line cross section may have less optical power than the peak of the signal, these aspects of the line are not evaluated separately in finding surface coordinates of an object and therefore do not represent separate pattern elements. Although the line may contain multiple pattern elements, these pattern elements are collinear.

General Discussion of a Method of Using Structured Light Scanners

Figure 2:
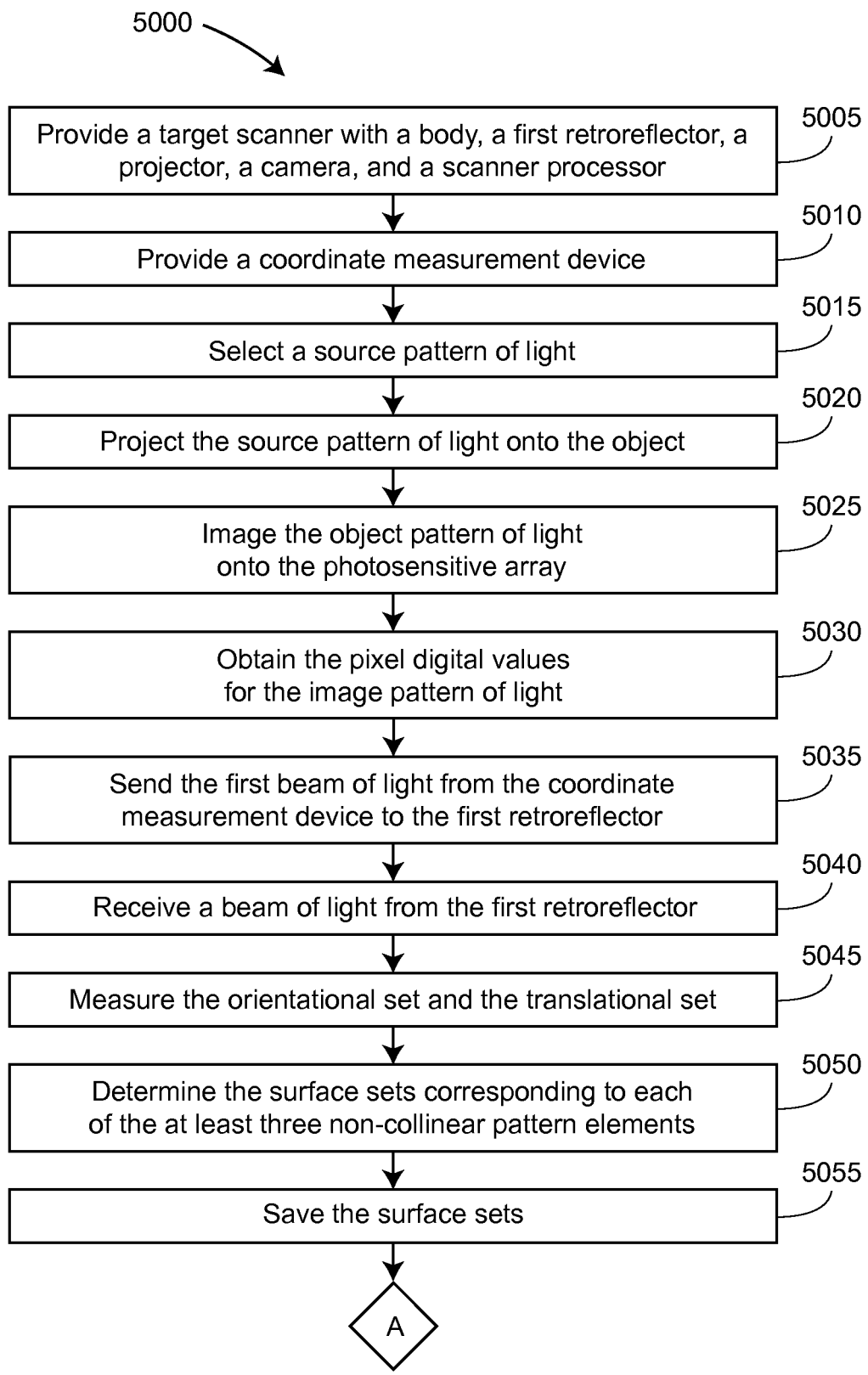
FIG. 2 depicts a flowchart of a method of measuring three or more surface sets on an object surface with a coordinate measurement device and a target scanner.

FIG. 2 is a flowchart illustrating steps 5000 in a method of measuring three or more surface sets on an object surface with a coordinate measurement device and a target scanner, each of the three or more surface sets being three-dimensional coordinates of a point on the object surface in a device frame of reference, each surface set including three values, the device frame of reference being associated with the coordinate measurement device.

The step 5005 is to provide the target scanner with a body, a first retroreflector, a projector, a camera, and a scanner processor, wherein the first retroreflector, projector, and camera are rigidly affixed to the body, and the target scanner is mechanically detached from the coordinate measurement device. In this step, the projector includes a source pattern of light, the source pattern of light located on a source plane and including at least three non-collinear pattern elements, the projector is configured to project the source pattern of light onto the object to form an object pattern of light on the object, and each of the at least three non-collinear pattern elements correspond to at least one surface set. Also in this step, the camera includes a camera lens and a photosensitive array, the camera lens configured to image the object pattern of light onto the photosensitive array as an image pattern of light, the photosensitive array including camera pixels, the photosensitive array configured to produce, for each camera pixel, a corresponding pixel digital value responsive to an amount of light received by the camera pixel from the image pattern of light.

The step 5010 is to provide the coordinate measurement device, the coordinate measurement device configured to measure a translational set and an orientational set, the translational set being values of three translational degrees of freedom of the target scanner in the device frame of reference and the orientational set being values of three orientational degrees of freedom of the target scanner in the device frame of reference, the translational set and the orientational set being sufficient to define a position and orientation of the target scanner in space, the coordinate measurement device configured to send a first beam of light to the first retroreflector and to receive a second beam of light from the first retroreflector, the second beam of light being a portion of the first beam of light, the coordinate measurement device including a device processor, the device processor configured to determine the orientational set and the translational set, the translational set based at least in part on the second beam of light. Also in this step, the scanner processor and the device processor are jointly configured to determine the three or more surface sets, each of the surface sets based at least in part on the translational set, the orientational set, and the pixel digital values.

The step 5015 is to select the source pattern of light.

The step 5020 is to project the source pattern of light onto the object to produce the object pattern of light.

The step 5025 is to image the object pattern of light onto the photosensitive array to obtain the image pattern of light.

The step 5030 is to obtain the pixel digital values for the image pattern of light.

The step 5035 is to send the first beam of light from the coordinate measurement device to the first retroreflector.

The step 5040 is to receive the second beam of light from the first retroreflector.

The step 5045 is to measure the orientational set and the translational set, the translational set based at least in part on the second beam of light.

The step 5050 is to determine the surface sets corresponding to each of the at least three non-collinear pattern elements.

The step 5055 is to save the surface sets. The method 5000 concludes with marker A.

DETAILED DISCUSSION OF EXAMPLE EMBODIMENTS

Figure 3:
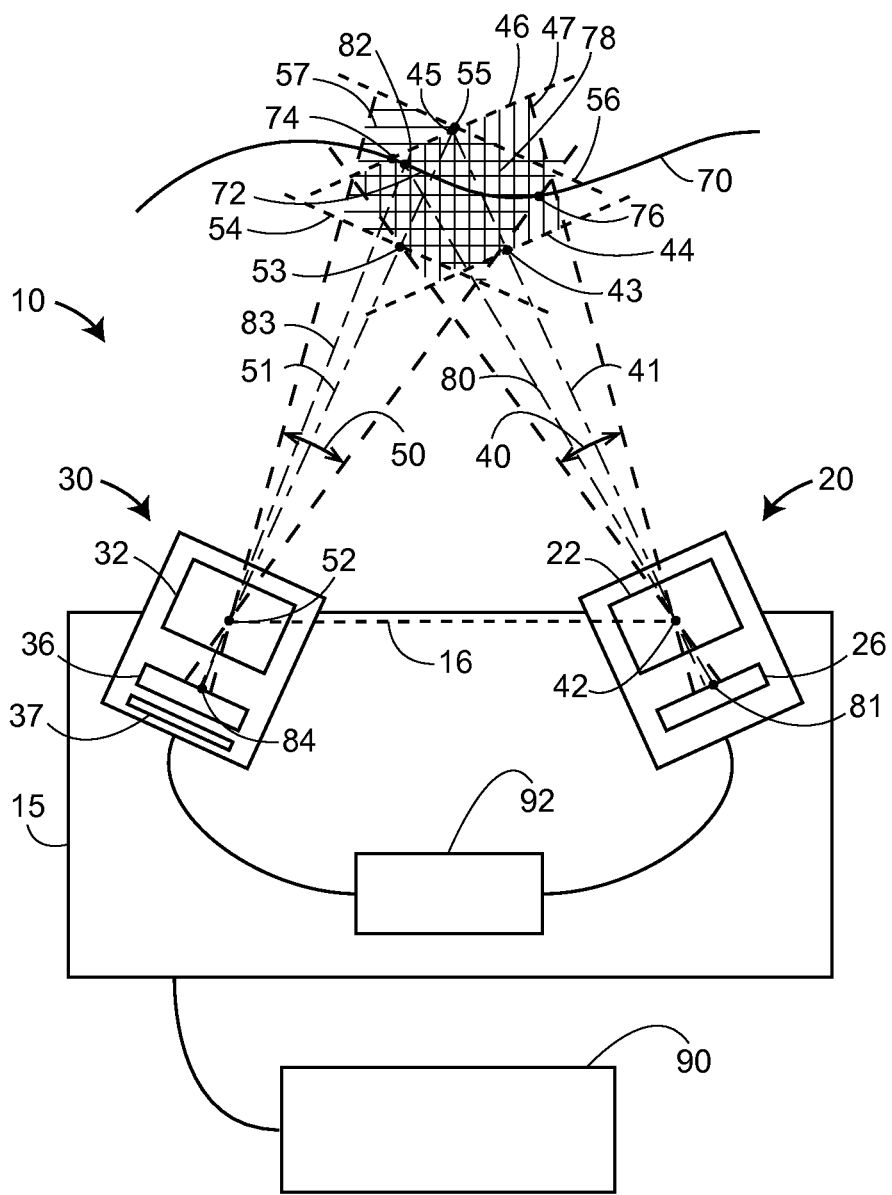
FIG. 3 depicts a triangulation scanner, in accordance with an embodiment of the invention.

In an embodiment illustrated in FIG. 3, a triangulation scanner 10 includes a frame 15, a projector 20 and a camera 30, with the camera and projector attached to the frame. The projector 20 includes a projector lens 22 and an illuminated pattern source 26. The projector 20 has a projector field of view (FOV) 40, a projector optical axis 41, a projector perspective center 42, a projector near point 43, a projector near plane 44, a projector far point 45, a projector far plane 46, a projector depth of field equal to a distance between the points 43 and 45, a projector near distance equal to a distance between the points 42 and 43, a projector far distance equal to a distance between the points 42 and 45. It is understood that the FOV is an angular region that covers a solid angle; in other words, the angular extent of FOV 40 extends on, out of, and into the paper in FIG. 3. The projector near plane 44 is a plane that is perpendicular to the projector optical axis 41 and that passes through the projector near point 43. The projector far plane 46 is a plane that is perpendicular to the projector optical axis 41 and that passes through the projector far point. The projector near planes and far planes establish a range of distances from the camera over which projected patterns on the surface 70 are relatively clear, which is to say the range over which the images are relatively unblurred (in focus). It will be appreciated from all that is disclosed herein that surface 70 may have x, y and z components relative to an orthogonal coordinate system, where the positive z-axis extends out of the paper as viewed from the perspective of FIG. 3. The dividing line between blurred and unblurred is defined in terms of requirements of a particular application, which in this case is in terms of the accuracy of 3D coordinates obtained with the scanner 10. The projector perspective center 42 is a point through which an ideal ray of light 80 passes after emerging from a corrected point 81 on its way to a point 82 on a surface 70. Because of aberrations in the lens 22, not all real rays of light emerge from the single perspective center point 42. However, in an embodiment, aberrations are removed by means of computational methods so that the point 81 is corrected in position to compensate for lens aberrations. Following such correction, each ideal ray 80 passes through the perspective center 42. Technical details regarding the concept of "perspective center" are given in '550, paragraph [0117]. A 3D region of space 47 (represented in FIG. 3 by vertical lines) within the projector FOV 40 and between the projector near plane 44 and the projector far plane 46 is considered to be a "projection in-focus" region. In this region, a pattern projected from the illuminated pattern source 26 onto a portion of the surface 70 is considered to be "in focus", which is to say that the pattern on the object surface within the region of space 47 is considered to be relatively clear rather than blurred.

The camera 30 includes a camera lens 32 and a photosensitive array 36. The camera 30 has a camera FOV 50, a camera optical axis 51, a camera perspective center 52, a camera near point 53, a camera near plane 54, a camera far point 55, a camera far plane 56, a camera depth of field equal to a distance between the points 53 and 55, a camera near distance equal to a distance between the points 52 and 53, a camera far distance equal to a distance between the points 52 and 55. The camera near plane 54 is a plane perpendicular to the camera optical axis 51 that passes through the camera near point 53. The camera far plane 56 is a plane perpendicular to the camera optical axis 51 that passes through the camera far point 55. The camera perspective center 52 is a point through which an ideal ray of light 83 passes after emerging from the point of light 82 on the surface 70 on its way to the corrected point 84 on the photosensitive array 36. Because of aberrations in the camera zoom lens 32, a real ray that passes through the camera perspective center 52 does not necessarily strike the photosensitive array at the corrected point 84. Rather in an embodiment the position of the point on the photosensitive array 36 is corrected computationally to obtain the corrected point 84. A 3D region of space 57 (represented in the drawing by horizontal lines) within the camera FOV 50 and between the camera near plane 54 and the camera far plane 56 is considered to be a "camera in-focus" region. In this region, a pattern on the surface 70 is considered to be "in focus" on the photosensitive array 36, which is to say that the pattern on the photosensitive array 36 is considered to be relatively clear rather than blurred.

A region of cross-hatched lines 78 in FIG. 3 represented by the overlap of horizontal lines in region 57 and vertical lines in region 47 is one in which the light projected on the surface 70 is in focus and the light imaged on to the array 36 is also in focus. The region 78 may be considered a sweet spot in which the most accurate measurements can be made. The location of the sweet spot 78 relative to the scanner 10 establishes the preferred standoff distance of the scanner 10 relative to the object 70 being measured, which is definable by the intersection of the boundaries formed by the projector FOV 40, the projector near plane 44, the projector far plane 46, the camera FOV 50, the camera near plane 54, and the camera far plane 56.

A straight line segment that extends directly between the projector perspective center 42 and the camera perspective center 52 is the baseline 16, and a length of the baseline is a baseline length. Using rules of trigonometry, such as triangulation calculations for example, 3D coordinates of a point on the surface 70 may be calculated based at least in part on the baseline length, the pose of the projector in a camera frame of reference, the pose of the camera in the baseline frame of reference, the position of a corresponding source point on the illuminated pattern source 26, and a position of a corresponding image point on the photosensitive array 36. The pose of the projector and camera is the position and orientation (i.e., six degrees of freedom) of the projector and camera, respectively, within the scanner frame of reference. It is understood that any frame of reference may be selected for the scanner.

A processor 92 may be used to provide projector control, to obtain digital data from the photosensitive array 36, and to process the data to determine 3D coordinates of points on the surface 70. The processor 92 may also be used in computations related to compensation procedures or to provide control for overall measurements according to a method (discussed further below with reference to FIG. 6). Optionally, a computer 90 may provide the functions described hereinabove for the processor 92. It may also be used to perform functions of application software, for example, in providing CAD models that may be fit to the collected 3D coordinate data. Either computer 90 or processor 92 may provide functions such as filtering or meshing of 3D point cloud data.

Figure 4:
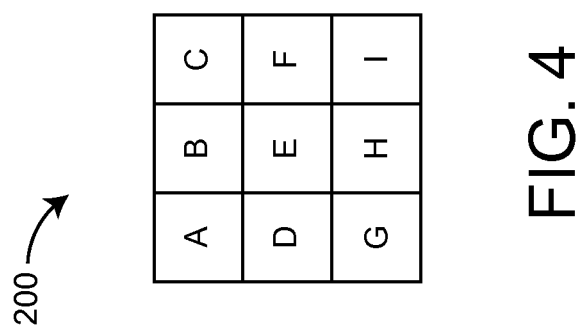
FIG. 4 depicts a coded pattern of light in which the coding is provided in two dimensions, for use in accordance with an embodiment of the invention.

In an embodiment, at a first time the projector 20 projects a coded pattern of light onto the surface 70. The term "coded pattern of light" is used herein to mean a pattern of light that provides 3D information based on a single measurement (a "single shot"). Specifically, a coded pattern of light refers to a pattern in which the coding is provided in two dimensions, as shown in FIG. 4. In this figure, each of the element values (A, B, C, D, F, G, H, I) of the array 200 is distinct from the element value E of the central cell of the array. In other words, each of the eight adjacent cells (i.e., nearest neighbor cells) is distinct from E. In an embodiment, a required condition is that the element values for each cell of the array be distinct from the element values of adjacent cells. When this condition is met, it is possible to obtain a one-to-one correspondence between points on the illuminated pattern source 26 and points on the photosensitive array 36. However, if the illuminated pattern source or camera has more resolution elements (e.g., pixels) than does the array 200, then there is a possibility of ambiguity in obtaining a correspondence. Such an ambiguity might occur, for example, if the element A were to appear a second time in the projected pattern on the illuminated pattern source 26. In an embodiment, this potential problem is eliminated by making each element distinct in the array of the illuminated pattern source 26.

Several types of coded patterns are possible, with some possible types described in section 5 of "Structured-light in 3D surface imaging: a tutorial," Advances in Optics and Photonics, 3, 128-160 (2011). Examples include pseudorandom binary array (PRBA) and mini-patterns used as code words. Many other types of patterns may be used. In these alternative patterns, non-alphanumeric elements may be substituted for the letters A-I in FIG. 4.

While FIG. 4 depicts the array 200 having a three-by-three cell structure, it will be appreciated that this is for illustration purposes only and is not intended to limit the scope of the invention, as other array cell structures, such as a four-by-four or a four-by-three cell structure, for example, may be suitable for a purpose disclosed herein. Any array row-by-column cell structure suitable for a purpose disclosed herein is contemplated and considered to be within the scope of the invention.

In an embodiment, at the first time, the lens 32 of camera 30 forms an image onto the photosensitive array 36 of the pattern projected onto a portion of the surface 70. Pixels within the photosensitive array 36 convert photons into electrical charges, which are transferred to an analog-to-digital converter (ADC) 37 that converts the analog electrical signal into a digital signal. The ADC may be integrated into the photosensitive array, for example, in a CMOS array, or integrated onto a circuit board adjacent to the photosensitive array, for example, in a CCD array. The digital signal is sent to a processor 92 that determines the correspondence between the pattern of the illuminated pattern source 26 and the pattern of the photosensitive array 36, which in an embodiment may be accomplished by the processor 92 facilitating a search of pixel values on the photosensitive array 36 that correspond with uniquely identifiable element values of the illuminated pattern source 26. Once the correspondence is known, a triangle may be drawn having a vertex at the projector perspective center 42, a vertex at a point 82 on the surface 70, and a vertex at the camera perspective center 52. By knowing the pixel location of the point 81 on the illuminated pattern source, the acute angle between the baseline 16 and the line segment from 81 to 82 may be determined, which is the same as the angle between the baseline 16 and the line segment from 42 to 82. Similarly, the knowing the pixel location of the point 84 on the photosensitive array, the acute angle between the baseline 16 and the line segment from 82 to 84 may be determined, which is the same as the angle between the baseline 16 and line segment from 52 to 82. With the baseline length known in addition to two angles of the triangles, it is possible to determine the lengths of all the triangle sides (42-82, 82-52, 52-42) and the values of all the triangle angles. In this way, the 3D coordinates of the portion of the surface 70 that has been illuminated by the light from the projector may be found.

The compensation parameters provide corrections for several quantities, including aberrations of projector and camera lenses. The processor 92 may include compensation parameters to calculate 3D surface coordinates to relatively higher accuracy or leave out compensation parameters to calculate 3D coordinates at relatively higher speed (and lower accuracy).

With the 3D coordinates known from the coded pattern of structured light, the object is moved to a preferred location. The object or scanner may be moved manually by an operator or it may be moved by a motorized device (movement 350 described below). In an embodiment, the motorized device is a robot operated under computer control. The movement of the scanner or object may include a change in the relative position of the scanner 10 and surface 70 to place the surface 70 within the sweet spot 78 of FIG. 3. The movement may also include a side-to-side change in relative position of the scanner 10 and the surface 70 to enable measurement of desired features or to systematically scan the entire surface 70.

Figure 5:
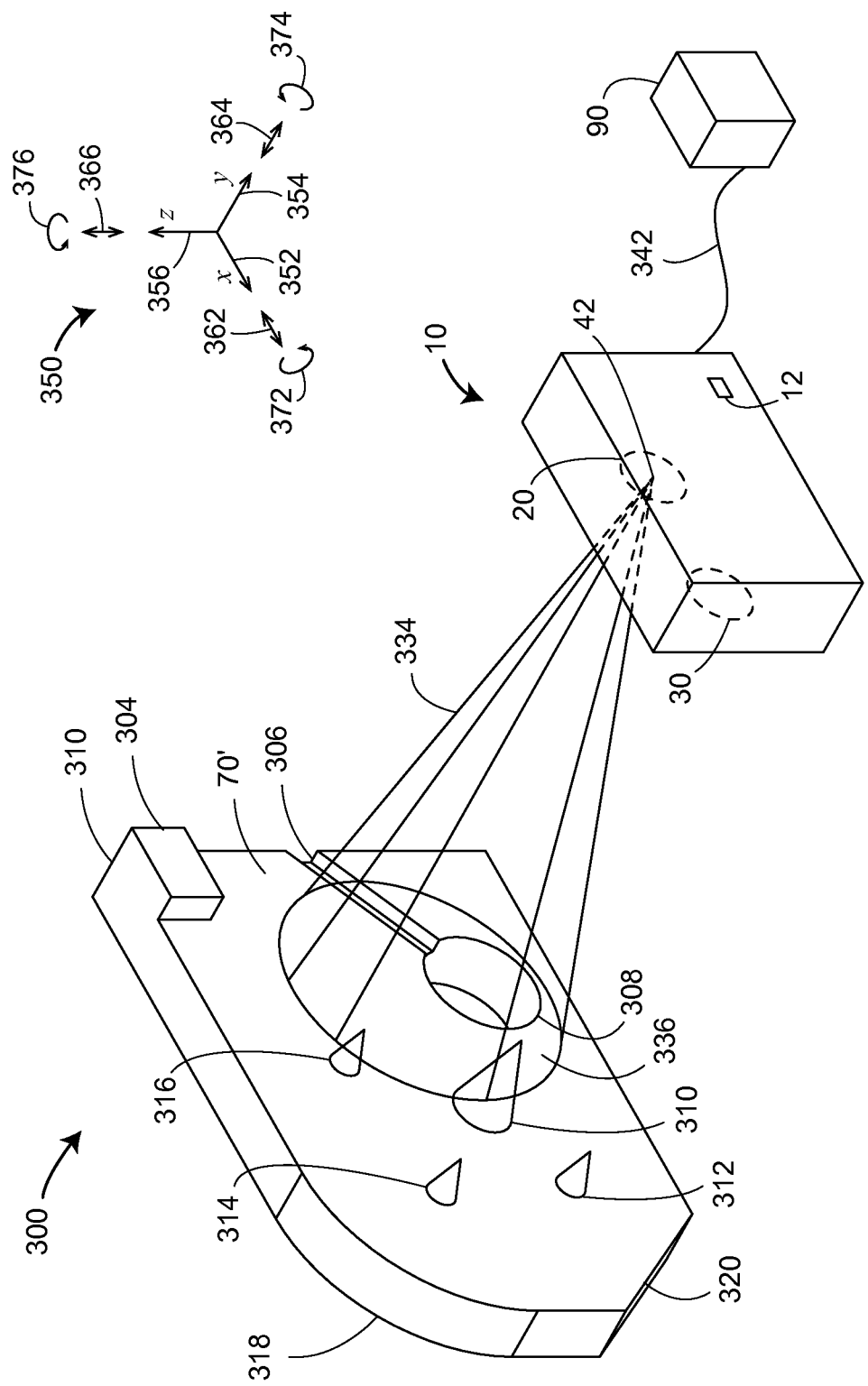
FIG. 5 depicts an object subject to measurement by the scanner of FIG. 3, in accordance with an embodiment of the invention.

FIG. 5 shows an object 300 having a surface 70' (similar to surface 70 in FIG. 3). The characteristics of the object 300 are measured by the scanner 10, which is optionally attached to a computer 90 through a cable 342 or wireless transmission channel. The projector 20 sends a coded pattern of structured light 334 from a projector perspective center 42 to the object 300. The object illuminates a region 336, which reflects light off the surface and is picked up by the camera 30. The light is captured by a photosensitive array within the camera 30 to obtain a digital signal that is analyzed by a processor within the scanner 10 or by the external computer 90 to obtain 3D coordinates of the surface 70'.

In an embodiment, a movement 350 is applied to the scanner 10 or object 300. The movement 350 is based at least in part on the calculated 3D coordinates obtained from the projection of the coded light. One type of movement 364 is applied to increase or decrease the separation between the scanner 10 and the surface 70'. In FIG. 5 this movement 364 is forward or backward along the y direction 354. An objective of this type of movement is to place the imaged surface within the scanner sweet spot (corresponding to the hatched area 78 of FIG. 3). Another type of movement is a tilt of the scanner. The scanner may be tilted by rotating it in a movement 372 about the x axis 352 (a "pitch" rotation) or tilted by rotating it in a movement 376 about the z axis 356 (a "yaw" rotation). An objective of tilting the scanner is to align the projector 20 and camera 30 to the object 300 to place as much surface area as possible in the scanner sweet spot.

The scanner or object may also be moved to measure desired features of the object 300 or to systematically scan the entire surface of the object 300. In the example of FIG. 5, in a region 336 the projected light 334 illuminates a circular hole 308, a portion of the cones 310, 316, and a portion of the channel 306. It does not illuminate the cones 312, 314, the fillet 318, the bevel 320, or the plateau 304.

In an embodiment, an operator provides movement to the desired position. For example, the operator may hold the scanner in hand and move it over the object while viewing a representation of the illuminated region on a display, which might be a computer monitor display or a display built into the scanner 10. The displayed image may be color coded to indicate whether the separation between the scanner 10 and the object 300 is too small or too large. For example, the scanned 3D data points (point cloud data) may be color coded green if in the sweet spot, blue/purple if too far away from the projector/camera, and yellow/red if too near the projector/camera. Alternatively, if the features are recognized as corresponding to portions of a CAD model, the color coding might be applied to the CAD model, or to the CAD model overlaid with point cloud data. The operator could respond to such a display by translating or tilting the scanner to bring the surface into the sweet spot. The display may also indicate whether the scanner is located in the desired side-to-side position, that is, the correct position in the x-z plane (that encompasses points on the plane defined by the axes 352, 356). The desired position might be a position in which selected features are measured according to an inspection plan. For example, an inspection plan might call for measurement of the height of plateau 304. The scanner may indicate the region to be measured by highlighting it on a display. Alternatively, the scanner may indicate the region to be measured by providing an illuminated indicator 12 on the scanner 10—for example, a left-right, up-down, back-forward indicator on the scanner body. As another alternative, the scanner might project a pattern of light having a temporal pattern that directs the operator to move the projected light to a desired location. For example, the scanner might move the beam in the direction of the plateau 304, pause for a moment, and then quickly retrace to the initial position. This pattern could be repeated until the scanner or object was moved into the desired position.

Once the operator has moved the scanner or object in the correct position, the operator locks the scanner and object into stationary positions. For example, the scanner might be attached to a magnetic base, vacuum base, or a carriage on a mechanical rail that the operator can quickly lock in place. If the object is large, it might be necessary to move the scanner or object several times. If the object is relatively small, a single scanner measurement may be sufficient. In an embodiment, the scanner automatically starts making a measurement when the scanner is within the sweet spot and is stable for enough time.

In an embodiment, the objective is for the operator to systematically measure the surface of a object in its entirety. In this case, the object may select a corner of the surface and then proceed in a pattern to measure each portion of the surface. For example, the procedure might be for the operator to move the object to the lower right corner of the object 300. The operator would then be prompted to move the object systematically from right to left, up and right, up and left, and so on until the entire object had been measured.

In an embodiment, the measured objects are evaluated to determine whether they are within the tolerances indicated on the mechanical drawings for the object. The evaluation includes subtracting measured values from specified values to determine an error. The error is compared to the allowable tolerances as indicated on the mechanical drawings to see whether the object is within specification or not.

The scanner or the object may be attached to a motorized device such as a robot. In an embodiment, the motorized device is operated under computer control. A processor within the scanner or a computer 90 determines whether the scanner needs to be moved nearer or farther from the object surface and whether the scanner needs to be tilted (rotated about the x and z axes in FIG. 5). In an embodiment, the scanner determines how the device should be moved to make a measurement or to begin a sequence of measurements. In an embodiment, the processor or computer recognizes the features corresponding to the surface measurements of the scanner 10 of the illuminated region 336. The features may be recognized in relation to a CAD model or to previous 3D scan data, for example. Based on this recognition, the motorized device may directly drive the scanner to a desired position, which might be one of a selection of regions to be measured.

In another embodiment, the scanner or object is adjusted to the sweet spot and then driven to an edge on the right or left side (in the x direction of FIG. 5). An edge may be recognized, for example, by a sharp drop-off in the three-dimensional coordinates or by a sudden drop in the optical power of reflected light. The object may then be moved down or up (in the z direction of FIG. 5) to locate one of the four corners—lower left, lower right, upper left, or upper right. In some cases, the object may extend beyond a rectangular region, and so it may be necessary to make additional measurements to cover these regions.

Following placement of the scanner or object in a desired location, a motorized device is usually mechanically stable enough so that the operator does not have to provide any additional means of stabilization. However, in some cases, the motorized object may not immediately come to rest. In these cases, it may be necessary to wait a prescribed time before beginning a measurement. Alternatively, a stability check may be carried out to ensure that the object and scanner are stable—for example, by repetitively measuring the 3D coordinates of surface features or edges using the projected coded pattern of light.

After the relative positions of the object and scanner have been adjusted based on 3D coordinates measured with the coded light, the scanner and object are held stationary while a sequential measurement is carried out. A sequential measurement requires projection of at least two patterns, but usually three or more patterns, at each of the stationary positions. In most cases, sequential measurements provide 3D coordinates based on measurements at each pixel of the photosensitive array of the camera without needing to match coded elements on the illuminated pattern source 26 with coded elements on the photosensitive array. For example, a common type of sequential measurement is one in which a sinusoidal fringe pattern is projected. The sinusoidal fringe pattern is a pattern having an irradiance (an optical power per unit area) that varies as a sine wave in a first direction on the illuminated pattern source 26. In the direction perpendicular to the first direction, the pattern is usually slowly varying over the projected area. In each of three (or more) measurements, the phase of the sine wave is shifted and the optical power received by each pixel is recorded for each of the three (or more) projected patterns. For example, a sine wave having a period (pitch) of 9 millimeters (mm) may be shifted for a particular pixel on the photosensitive array by 0 mm in a first measurement, by 3 mm in a second measurement, and by 6 mm in a third measurement. These shifts in distance correspond to phase shifts of 0 degrees, 120 degrees and 240 degrees, respectively. By noting the digital signals emerging from a given pixel in the three measurements, a mathematical formula may be used to determine the initial phase, which in this case is zero degrees. The phase is known for each point of the sinusoidal pattern on the projector plane of light (the element 26, illuminated pattern source, in FIG. 3). A correspondence can therefore be drawn between the points on the projector plane and the points on the photosensitive array, which enables the sides and angles of the triangle having vertices 42, 52, 82 in FIG. 3 to be determined. An advantage of a sequential method such as the one described above is that the mathematical computations may be designed to eliminate (cancel out) the deleterious effects of background light.

In many cases, when a sequential pattern of light is used, it is necessary to remove ambiguity in the measured pattern. An ambiguity will exist when a pattern has more than one period, resulting in two (or more) different distances possible from the camera perspective center 52 to an object point 82. For example, a sinusoidal fringe pattern may include 20 sine wave periods over the width of the projected light, with a first calculated distance corresponding to a first fringe pattern, a second calculated distance to a second fringe pattern, and a third calculated distance to a third fringe pattern. A common method to eliminate ambiguities is to project one or more binary patterns of light so as to establish a range of possible distances possible for each point on the surface.

Figure 6:
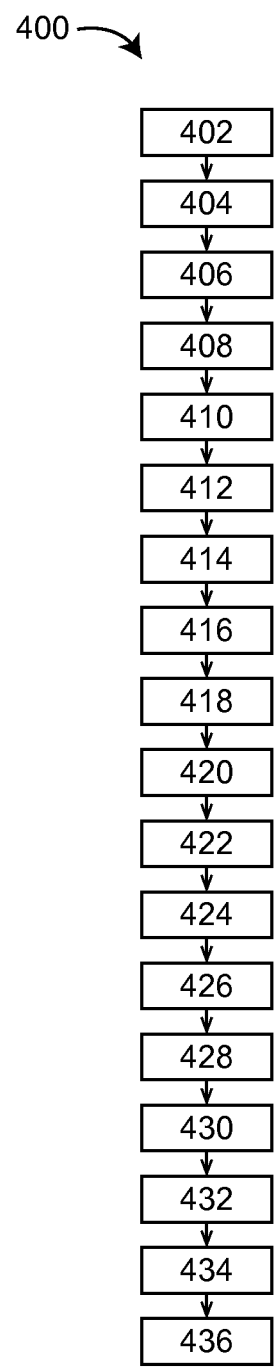
FIG. 6 depicts a flowchart of a method for measuring three-dimensional (3D) coordinates of a surface of an object, in accordance with an embodiment of the invention.

In view of all of the foregoing, it will be appreciated that an embodiment of the invention includes a method 400 for measuring three-dimensional (3D) coordinates of a surface 70, 70' of an object 300, which will now be described with reference to FIG. 6.

At block 402, the method includes: providing a structured light scanner that includes a processor, a projector, and a camera, the scanner having a first frame of reference, the projector including a plane of patterned illumination and a projector lens, the projector having a projector perspective center, the camera including a photosensitive array and a camera lens, the camera having a camera perspective center, the photosensitive array including an array of pixels, the scanner having a baseline, the baseline being a straight line segment between the projector perspective center and the camera perspective center, the camera having a camera pose in the first frame of reference, the projector having a projector pose in the first frame of reference, the processor further configured to control the plane of patterned illumination.

At block 404, the method further includes: generating by the processor at a first time a first coded projector pattern of light on the plane of patterned illumination, the first coded projector pattern of light being confined to a window in the plane, the window including a collection of subwindows arranged in two dimensions on the plane with each subwindow within the collection of subwindows having a subwindow pattern of light different than and distinguishable from the subwindow pattern of light of each adjacent subwindow.

At block 406, the method further includes: imaging the first coded projector pattern of light with the projector lens onto a first portion of the surface to obtain a first coded surface pattern of light on the first portion.

At block 408, the method further includes: forming with the camera lens a first coded image on the photosensitive array and generating in response a first coded array, the first coded image being an image on the photosensitive array of the first coded surface pattern of light, the first coded array being an array of digital values.

At block 410, the method further includes: sending the first coded array to the processor.

At block 412, the method further includes: determining a correspondence between each element of the first coded array and one of the subwindows.

At block 414, the method further includes: determining in the first frame of reference first coded 3D coordinates, the first coded 3D coordinates being 3D coordinates of points on the first portion, the first coded 3D coordinates based at least in part on the first coded projector pattern of light, the first coded array, the correspondence, a length of the baseline, the camera pose, and the projector pose. In an embodiment, the first coded 3D coordinates are determined via the processor using rules of trigonometry, such as triangulation calculations for example.

At block 416, the method further includes: moving the scanner or the object to change the object from a first pose to a second pose, the first pose and the second pose given in the first frame of reference, the second pose based at least on the first coded 3D coordinates and on a preferred scanner standoff distance.

At block 418, the method further includes: generating at a second time a first sequential projector pattern of light on the plane of patterned illumination.

At block 420, the method further includes: imaging the first sequential projector pattern of light with the projector lens onto a second portion of the surface to obtain a first sequential surface pattern of light on the second portion.

At block 422, the method further includes: forming with the camera lens a first sequential image on the photosensitive array and generating in response a first sequential array, the first sequential image being an image on the photosensitive array of the first sequential surface pattern of light, the first sequential array being an array of digital values.

At block 424, the method further includes: sending the first sequential array to the processor.

At block 426, the method further includes: generating at a third time a second sequential projector pattern of light on the plane of patterned illumination.

At block 428, the method further includes: imaging the second sequential projector pattern of light with the projector lens onto the second portion to obtain a second sequential surface pattern of light on the second portion.

At block 430, the method further includes: forming with the camera lens a second sequential image on the photosensitive array and generating in response a second sequential array, the second sequential image being an image on the photosensitive array of the second sequential surface pattern of light, the second sequential array being an array of digital values;

At block 432, the method further includes: sending the second sequential array to the processor.

At block 434, the method further includes: determining in the first frame of reference sequential 3D coordinates, the sequential 3D coordinates being 3D coordinates of points on the second portion, the sequential 3D coordinates based at least in part on the first sequential projector pattern of light, the first sequential array, the second sequential projector pattern of light, the second sequential array, the length of the baseline, the camera pose, and the projector pose. In an embodiment, the sequential 3D coordinates are determined via the processor using rules of trigonometry, such as triangulation calculations for example.

And at block 436, the method further includes: storing the sequential 3D coordinates.

It will also be appreciated that the invention encompasses variations on the foregoing method, which will now be described.

At the method block 404 of generating by the processor at a first time a first coded projector pattern of light on the plane of patterned illumination, each subwindow within the collection of subwindows having a subwindow pattern of light is further different than and distinguishable from the subwindow pattern of light of each of the other subwindows.

At the method block 416 of moving the scanner or the object surface from a first pose to a second pose, the second pose is further based at least in part on identifying with the processor a first object feature; and/or the second pose is further based at least in part on matching the identified feature to a computer aided drawing (CAD) model of the object; and/or the second pose is further based at least in part on a scanned representation of a third portion of the surface, the third portion including a region of the surface not included in the first portion or the second portion; and/or the second pose is further based at least in part on observing via the processor an edge of the object.

Method 400 may further include a step of displaying a representation of the object surface, the representation based at least in part on the coded 3D coordinates. Wherein at the method block 416 of moving the scanner or the object, the second pose is further based on moving the scanner or the object by a user, the moving based at least in part on the coded 3D coordinates on the display. Wherein in the step of displaying the coded 3D coordinates on a display, the coded 3D coordinates are displayed in real time; and/or the coded 3D coordinates are colored to indicate a relative position of each of the 3D coordinate points relative to one or more locations on the scanner.

At the method block 416 of moving the scanner or the object, the second pose is further based at least in part on a depth of field of the scanner.

At the method block 416 of moving the scanner or the object, the moving is performed by a motorized device, and optionally the motorized device is a robot.

Method 400 may further include the steps of: generating at a fourth time a third sequential projector pattern of light on the plane of patterned illumination; imaging the third sequential projector pattern of light with the projector lens onto the second portion to obtain a third sequential surface pattern of light on the second portion; forming with the camera lens a third sequential image on the photosensitive array and generating in response a third sequential array, the third sequential image being an image on the photosensitive array of the third sequential surface pattern of light, the third sequential array being an array of digital values; sending the third sequential array to the processor; and wherein, in the step of determining in the first frame of reference sequential 3D coordinates, the sequential 3D coordinates are further based at least in part on the third sequential surface pattern of light and the third sequential array. Wherein at the step of determining in the first frame of reference sequential 3D coordinates, the determining further includes calculating a phase of a pixel in the photosensitive array, the phase based at least in part on a first level of light received by the pixel in the first sequential image, a second level of light received by the pixel in the second sequential image, and a third level of light received by the pixel in the third sequential image. Or wherein at the step of determining in the first frame of reference first coded 3D coordinates, the sequential 3D coordinates are based at least in part on the first coded 3D coordinates.

Method 400 may further include a step of adjusting with the processor an average level of optical power of the first sequential projector pattern of light, the adjusting based at least in part on the first coded array.

In an embodiment particularly advantageous to the inventive method described herein, ambiguities are eliminated based on the distances determined from the coded pattern of light projected onto the surface. In other words, in an embodiment in which a coded pattern is used first to provide information needed to position the scanner and object, the same information may be used to eliminate ambiguity in the sequential measurement.

The invention claimed is:

1. A method for measuring three-dimensional (3D) coordinates of a surface of an object, the method comprising:

providing a structured light scanner that includes a processor, a projector, and a camera;

generating by the processor at a first time a first coded projector pattern of light on a plane of patterned illumination, the first coded projector pattern of light being confined to a window in the plane, the window including a collection of subwindows arranged in two dimensions on the plane with each subwindow within the collection of subwindows having a subwindow pattern of light different than and distinguishable from the subwindow pattern of light of each adjacent subwindow;

imaging the first coded projector pattern of light using the projector onto a first portion of the surface of the object to obtain a first coded surface pattern of light on the first portion;

forming using the camera a first coded image that is an image of the first coded surface pattern of light and generating in response a first coded array, the first coded array being an array of digital values;

sending the first coded array to the processor;

determining via the processor a correspondence between each element of the first coded array and respective ones of the subwindows;

determining via the processor in a first frame of reference of the scanner first coded 3D coordinates, the first coded 3D coordinates being 3D coordinates of points on the first portion, the first coded 3D coordinates based at least in part on the first coded projector pattern of light, the first coded array, the correspondence, a length of a baseline distance between the camera and the projector, a pose of the camera, and a pose of the projector;

moving the scanner or the object to change the object from a first pose to a second pose, the movement of the scanner or object being based at least in part on the first coded 3D coordinates, the first pose and the second pose of the object being given in the first frame of reference;

generating via the processor at a second time a first sequential projector pattern of light on the plane of patterned illumination, the first sequential projector pattern of light being a non-coded pattern;

imaging the first sequential projector pattern of light using the projector onto a second portion of the surface of the object to obtain a first sequential surface pattern of light on the second portion;

forming using the camera a first sequential image that is an image of the first sequential surface pattern of light and generating in response a first sequential array, the first sequential array being an array of digital values, wherein the scanner is held in the second pose during the forming of the first sequential image;

sending the first sequential array to the processor;

generating via the processor at a third time a second sequential projector pattern of light on the plane of patterned illumination, the second sequential projector pattern of light being a non-coded pattern;

imaging the second sequential projector pattern of light using the projector onto the second portion of the surface of the object to obtain a second sequential surface pattern of light on the second portion;

forming using the camera a second sequential image that is an image of the second sequential surface pattern of light and generating in response a second sequential array, the second sequential array being an array of digital values, wherein the scanner is held in the second pose during the forming of the second sequential image;

sending the second sequential array to the processor;

determining via the processor in the first frame of reference sequential 3D coordinates, the sequential 3D coordinates being 3D coordinates of points on the second portion, the sequential 3D coordinates based at least in part on the first sequential projector pattern of light, the first sequential array, the second sequential projector pattern of light, the second sequential array, the length of the baseline, the camera pose, and the projector pose; and storing the sequential 3D coordinates.

2. The method of claim 1 wherein, in the step of generating by the processor at a first time a first coded projector pattern of light on the plane of patterned illumination, each subwindow within the collection of subwindows having a subwindow pattern of light is further different than and distinguishable from the subwindow pattern of light of each of the other subwindows.

3. The method of claim 1 wherein, in the step of moving the scanner and/or the object from a first pose to a second pose, the second pose is further based at least in part on identifying with the processor a first object feature.

4. The method of claim 3 wherein, in the step of moving the scanner and/or the object, the second pose is further based at least in part on matching the identified first object feature to a computer aided drawing (CAD) model of the object.

5. The method of claim 3 wherein, in the step of moving the scanner and/or the object, the second pose is further based at least in part on a scanned representation of a third portion of the surface of the object, the third portion including a region of the surface not included in the first portion or the second portion.

6. The method of claim 3 wherein, in the step of moving the scanner and/or the object, the second pose is further based at least in part on observing via the processor an edge of the object.

7. The method of claim 1 further including, displaying a representation of the surface of the object on a display, the representation based at least in part on the coded 3D coordinates.

8. The method of claim 7 wherein, in the step of moving the scanner and/or the object, the second pose is further based on moving the scanner and/or the object by a user, the moving based at least in part on the coded 3D coordinates on the display.

9. The method of claim 8 wherein, in the step of displaying the coded 3D coordinates on a display, the coded 3D coordinates are displayed in real time.

10. The method of claim 8 wherein, in the step of displaying the coded 3D coordinates on a display, the coded 3D coordinates are colored to indicate a relative position of each of the 3D coordinate points relative to one or more locations on the scanner.

11. The step of claim 1 wherein, in the step of moving the scanner and/or the object, the second pose is further based at least in part on a depth of field of the scanner.

12. The method of claim 1 wherein, in the step of moving the scanner and/or the object, the moving is performed by a motorized device.

13. The method of claim 12 wherein, in the step of moving the scanner and/or the object, the motorized device is a robot.

14. The method of claim 1 wherein the method further includes:
generating via the processor at a fourth time a third sequential projector pattern of light on the plane of patterned illumination;
imaging the third sequential projector pattern of light using the projector onto the second portion of the surface of the object to obtain a third sequential surface pattern of light on the second portion;
forming using the camera a third sequential image that is an image of the third sequential surface pattern of light and generating in response a third sequential array, the third sequential array being an array of digital values;
sending the third sequential array to the processor; and
wherein, in the step of determining via the processor in the first frame of reference sequential 3D coordinates, the sequential 3D coordinates are further based at least in part on the third sequential surface pattern of light and the third sequential array.

15. The method of claim 14 wherein, in the step of determining via the processor in the first frame of reference sequential 3D coordinates, the determining further includes calculating a phase of a pixel in a photosensitive array of the camera, the phase based at least in part on a first level of light received by the pixel in the first sequential image, a second level of light received by the pixel in the second sequential image, and a third level of light received by the pixel in the third sequential image.

16. The method of claim 1 further including, adjusting via the processor an average level of optical power of the first sequential projector pattern of light, the adjusting based at least in part on the first coded array.

17. The method of claim 14 wherein, in the step of determining via the processor in the first frame of reference first coded 3D coordinates, the sequential 3D coordinates are based at least in part on the first coded 3D coordinates.

18. The method of claim 1, wherein: the scanner has a first frame of reference; the projector includes a plane of patterned illumination and a projector lens, the projector having a projector perspective center; the camera includes a photosensitive array and a camera lens, the camera having a camera perspective center, the photosensitive array including an array of pixels; the scanner having a baseline, the baseline being a straight line segment between the projector perspective center and the camera perspective center; the camera having a camera pose in the first frame of reference; the projector having a projector pose in the first frame of reference; and, the processor further configured to control the plane of patterned illumination.

19. The method of claim 18, wherein: the first coded image is formed on the photosensitive array using the camera lens; the first sequential image is formed on the photosensitive array using the camera lens; and, the second sequential image is formed on the photosensitive array using the camera lens.

20. The method of claim 18, wherein the step of determining via the processor a correspondence between each element of the first coded array and respective ones of the subwindows comprises: facilitating via the processor a search of pixel values on the photosensitive array that have one-to-one correspondence with uniquely identifiable element values of the illuminated pattern source.

21. The method of claim 1, wherein: in the step of determining via the processor in a first frame of reference of the scanner first coded 3D coordinates, and in the step of determining via the processor in the first frame of reference sequential 3D coordinates, each step comprises: executing via the processor triangulation calculations.

22. An apparatus for measuring three-dimensional (3D) coordinates of a surface of an object, the apparatus comprising:
   a structured light scanner comprising a processor, a projector, and a camera;
   wherein the processor is responsive to executable instructions which when executed by the processor facilitates the following method:
   generating by the processor at a first time a first coded projector pattern of light on a plane of patterned illumination, the first coded projector pattern of light being confined to a window in the plane, the window including a collection of subwindows arranged in two dimensions on the plane with each subwindow within the collection of subwindows having a subwindow pattern of light different than and distinguishable from the subwindow pattern of light of each adjacent subwindow;
   imaging the first coded projector pattern of light using the projector onto a first portion of the surface of the object to obtain a first coded surface pattern of light on the first portion;
   forming using the camera a first coded image that is an image of the first coded surface pattern of light and generating in response a first coded array, the first coded array being an array of digital values;
   sending the first coded array to the processor;
   determining via the processor a correspondence between each element of the first coded array and respective ones of the subwindows;
   determining via the processor in a first frame of reference of the scanner first coded 3D coordinates, the first coded 3D coordinates being 3D coordinates of points on the first portion, the first coded 3D coordinates based at least in part on the first coded projector pattern of light, the first coded array, the correspondence, a length of a baseline distance between the camera and the projector, a pose of the camera, and a pose of the projector;
   moving the scanner or the object to change the object from a first pose to a second pose, the movement of the scanner or object being based at least in part on the first coded 3D coordinates, the first pose and the second pose of the object being given in the first frame of reference;
   generating via the processor at a second time a first sequential projector pattern of light on the plane of patterned illumination, the first sequential projector pattern of light being a non-coded pattern;
   imaging the first sequential projector pattern of light using the projector onto a second portion of the surface of the object to obtain a first sequential surface pattern of light on the second portion;
   forming using the camera a first sequential image that is an image of the first sequential surface pattern of light and generating in response a first sequential array, the first sequential array being an array of digital values, wherein the scanner is held in the second pose during the forming of the first sequential image;
   sending the first sequential array to the processor;
   generating via the processor at a third time a second sequential projector pattern of light on the plane of patterned illumination, the second sequential projector pattern of light being a non-coded pattern;
   imaging the second sequential projector pattern of light using the projector onto the second portion of the surface of the object to obtain a second sequential surface pattern of light on the second portion;
   forming using the camera a second sequential image that is an image of the second sequential surface pattern of light and generating in response a second sequential array, the second sequential array being an array of digital values, wherein the scanner is held in the second pose during the forming of the second sequential image;
   sending the second sequential array to the processor;
   determining via the processor in the first frame of reference sequential 3D coordinates, the sequential 3D coordinates being 3D coordinates of points on the second portion, the sequential 3D coordinates based at least in part on the first sequential projector pattern of light, the first sequential array, the second sequential projector pattern of light, the second sequential array, the length of the baseline, the camera pose, and the projector pose; and
   storing the sequential 3D coordinates.

* * * * *